United States Patent
Whitby-Strevens

(10) Patent No.: US 9,319,090 B2
(45) Date of Patent: Apr. 19, 2016

(54) METHODS AND APPARATUS FOR LOW POWER AUDIO VISUAL INTERFACE CALIBRATION

(71) Applicant: Apple Inc., Cupertino, CA (US)

(72) Inventor: Colin Whitby-Strevens, Ben Lomond, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/500,817

(22) Filed: Sep. 29, 2014

(65) Prior Publication Data

US 2015/0085905 A1    Mar. 26, 2015

Related U.S. Application Data

(63) Continuation of application No. 13/274,225, filed on Oct. 14, 2011, now Pat. No. 8,848,809.

(51) Int. Cl.
*H04B 1/40* (2015.01)
*H04L 1/00* (2006.01)
*H04L 25/03* (2006.01)
*H04B 17/00* (2015.01)

(52) U.S. Cl.
CPC .............. *H04B 1/40* (2013.01); *H04B 17/0005* (2013.01); *H04L 1/0001* (2013.01); *H04L 25/03343* (2013.01)

(58) Field of Classification Search
CPC ................................ H04B 17/00; H04L 25/03
USPC .......................................................... 375/219
See application file for complete search history.

(56) References Cited

U.S. PATENT DOCUMENTS

| | | | |
|---|---|---|---|
| 7,853,731 B1 * | 12/2010 | Zeng ................................ 710/18 |
| 7,899,941 B2 * | 3/2011 | Hendry et al. ..................... 710/1 |
| 8,468,285 B2 * | 6/2013 | Kobayashi .................... 710/302 |
| 2004/0221056 A1 | 11/2004 | Kobayashi et al. |
| 2004/0228365 A1 * | 11/2004 | Kobayashi .................... 370/477 |
| 2005/0157781 A1 | 7/2005 | Ho et al. |
| 2009/0189442 A1 * | 7/2009 | Chi .................................... 307/2 |
| 2010/0082859 A1 * | 4/2010 | Hendry et al. .................. 710/60 |
| 2010/0329319 A1 * | 12/2010 | Dai et al. ....................... 375/224 |
| 2011/0052142 A1 * | 3/2011 | Sultenfuss et al. ............. 386/232 |
| 2011/0276710 A1 * | 11/2011 | Mighani et al. ............... 709/231 |
| 2012/0229076 A1 * | 9/2012 | Zhu et al. ....................... 320/107 |

OTHER PUBLICATIONS

Video Electronics Standards Association, "VESA DisplayPort Standard," Version 1, Revision 2, Jan. 5, 2010, pp. 1-516.

(Continued)

*Primary Examiner* — Jaison Joseph
(74) *Attorney, Agent, or Firm* — Gazdzinski & Associates, PC

(57) ABSTRACT

Methods and apparatus for calibration of interface operation of a display device. In one exemplary embodiment of the invention, an embedded DisplayPort (eDP) source element (such as a graphics processing unit (GPU)) configures itself to support the minimum requirements necessary to support a sink element (such as a screen display). Unlike prior art solutions, minimum sink requirements are identified during a calibration process, and the source is configured accordingly. By tailoring the source to the specific requirements of the sink, the device can initialize faster, consume less power, etc. Moreover, in another aspect of the present invention, if a device does not initialize to an expected configuration based on prior calibration settings, the device can be flagged as having faulty or failing components.

20 Claims, 6 Drawing Sheets

(56) References Cited

OTHER PUBLICATIONS

Video Electronics Standards Association, "VESA DisplayPort Panel Connector Standard," Version 1.1, Jan. 4, 2008, pp. 1-11.

Video Electronics Standards Association, "VESA DisplayPort PHY Compliance Test Standard," Version 1.1, Oct. 26, 2009, pp. 1-95.
Video Electronics Standards Association, "VESA DisplayPort Link Layer Compliance Test Standard," Version 1.1, Oct. 2, 2009, pp. 1-195.

* cited by examiner

METHODS AND APPARATUS FOR LOW POWER AUDIO VISUAL INTERFACE CALIBRATION

PRIORITY

This application is a continuation of and claims priority to co-owned, co-pending U.S. patent application Ser. No. 13/274,225 of the same title, filed Oct. 14, 2011, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices and user interfaces. More particularly, in one exemplary aspect, the present invention is directed to calibration of embedded interface operation, such as for example with respect to Embedded DisplayPort™ (eDP) implementations.

2. Description of Related Technology

The presentation of audio and visual elements has a direct impact on customer satisfaction. For example, many multimedia devices are widely judged (and purchased) according to qualities such as display quality, sound fidelity, smooth rendering, crispness of the display, lack of motion artifact or "jerkiness", etc. Other areas of multimedia applications which affect consumers include interoperation (e.g., with other equipment, legacy standards, etc.), ease of use, cost, power consumption.

To these ends, audio/visual (A/V) interface technologies have evolved from simple display logic circuits into complex systems capable of, inter alia, platform-independent operation, networked operation, "plug and play" connection, etc. Moreover, current display interface technologies support seamless legacy display operation; i.e., newer functionality is layered over existing legacy protocols. For example, secondary data may be transmitted during time intervals which are otherwise ignored or not utilized by legacy devices.

DisplayPort™ is one example of a display interface technology referred to above. It is specified by the Video Electronics Standards Association (VESA). Current incarnations of the DisplayPort standard specify support for simple networking of digital audio/visual (A/V) interconnects, intended to be used primarily between an arbitrary assembly of multimedia "sources" (e.g., computers or CPUs) and "sinks" (e.g., display monitors or other video rendering devices, home-theater systems, etc.).

Extant DisplayPort technology is an extensible digital interface solution that is designed for a wide variety of performance requirements, and broadly supports inter alia, PCs, monitors, panels, projectors, and high definition (HD) content applications. Current DisplayPort technology is also capable of supporting both internal (e.g., chip-to-chip), and external (e.g., box-to-box) digital display connections. Examples of internal chip-to-chip applications include notebook PCs, which drive a display panel from a graphics controller, or display components from display controllers driving the monitor of a television. Examples of box-to-box applications include display connections between PCs and monitors, and projectors (i.e., not housed within the same physical device). Consolidation of internal and external signaling methods enables the "direct drive" of digital monitors. Direct drive eliminates the need for control circuits, and allows for among other things, less costly and reduced profile (e.g., slimmer or smaller form factor) display devices.

However, while extant DisplayPort technology is well suited for a wide range of applications, certain applications do not require the full functionality of DisplayPort. For example, Embedded DisplayPort (eDP) was developed specifically to enable standardized display interfaces for embedded-type fixed interfaces (e.g., for internally connecting a graphics card to laptop displays, tablet computer displays, etc.). Initial standards for eDP were largely based on the existing DisplayPort standard, however in subsequent standard releases, significant changes and optimizations have been added that further depart from traditional DisplayPort. One such area which has been left largely unchanged is the DisplayPort calibration sequence. The DisplayPort calibration process is designed to maximize the interoperability of DisplayPort sources and sinks while maintaining significant margin to compensate for cabling losses. Unlike DisplayPort, eDP is intended only for closed systems (i.e., systems that have essentially known sources, sinks and cable losses). Thus, existing schemes for eDP calibration do not have the same requirements for interoperability that the generic DisplayPort interfaces require.

Accordingly, improved solutions are required for Embedded DisplayPort (eDP) calibration. Specifically, such improved solutions should be optimized for link calibration between known eDP sources, eDP sinks, and cabling configurations. More generally, improved methods and apparatus are required for calibrating transceivers within closed systems. Such solutions should ideally offer improved performance, reduced manufacturing time, etc.

SUMMARY OF THE INVENTION

The present invention satisfies the aforementioned needs by providing, inter alia, improved apparatus and methods for calibration of embedded interface operation.

In a first aspect, a method for calibrating the operation of at least a transmitter for a receiver is disclosed. In one embodiment, the method is based on one or more minimum receiver requirements of the receiver and includes: configuring one or more receive path components; determining one or more minimum receiver requirements of the receiver; calibrating one or more transmitter settings based at least in part on the one or more minimum receiver requirements; and storing the calibrated one or more transmitter settings.

In a first variant, the one or more receive path components includes an equalizer, and configuring the one or more receive path components includes configuring the equalizer. The determination of one or more minimum receiver requirements is based at least in part on a bit error rate (BER) calculated from a received test pattern.

In another variant, the calibrating one or more transmitter settings includes determining an anchor point based at least in part on the one or more minimum receiver requirements, and calculating at least one other transmitter setting based at least in part on the determined anchor point. Furthermore in this variant, the stored calibrated transmitter settings are recalled during a link initialization procedure.

In another variant, the transmitter includes an Embedded DisplayPort (eDP) source, and the receiver includes an Embedded DisplayPort (eDP) sink.

In yet another variant, the method further includes determining one or more second minimum receiver requirements of at least a second receiver. One or more second transmitter settings are calibrated based on the one or more second minimum receiver requirements; and the one or more second transmitter settings are stored.

In still another variant, the method further comprises calibrating one or more second transmitter settings based on the one or more second minimum receiver requirements, and storing only one of either the one or more transmitter settings and one or more second transmitter settings.

In yet another variant, the method further includes determining one or more second minimum receiver requirements from at least a second transmitter. One or more second transmitter settings are calibrated based on the one or more second minimum receiver requirements; and the one or more second transmitter settings are stored. The transmitter and second transmitter may not be calibrated concurrently.

In a second aspect of the invention, a device configured to calibrate operation of at least a first transmitter for a first receiver is disclosed. In one embodiment, the calibration is based on one or more minimum receiver requirements of the first receiver, and the device includes: a first receiver coupled to a link and a first transmitter coupled to the link. The first receiver includes logic configured to configure one or more receive path components, and logic configured to calculate an error rate of the link based on a test pattern; and the first transmitter includes logic configured to transmit the test pattern on the link, logic configured to determine one or more minimum first receiver requirements based at least on the calculated error rate, and logic configured to calibrate one or more first transmitter settings based at least in part on the one or more minimum first receiver requirements.

In one variant, the device includes an Embedded DisplayPort (eDP) device. The first receiver includes an eDP sink and the first transmitter includes an eDP source.

In a third aspect, apparatus comprising at least a transmitter and a receiver, where the transmitter is coupled to the receiver with a lossy connection, is disclosed. In one embodiment, the apparatus includes: a processor; and a computer readable apparatus having a storage medium with at least one computer program stored thereon.

In one variant, the computer program is configured to, when executed on the processor: determine one or more minimum first receiver requirements of the first receiver; calibrate one or more first transmitter settings based at least in part on the one or more minimum first receiver requirements; and initiate a link based on the calibrated one or more first transmitter settings.

Link initiation in another variant includes a selection of one of the one or more transmitter settings; e.g., a voltage swing level and a pre-emphasis level.

In another variant, the one or more transmitter settings includes an anchor point, where the anchor point is associated with the minimum first receiver requirements.

The at least one computer program may further be configured to initiate the link at the anchor point. In one variant, the computer program is further configured to: verify if the link is acceptable at the anchor point based at least in part on a required bit error rate (BER); if the link is acceptable, commence operation; and if the link is not acceptable flag an error.

In another variant, the computer program is further configured to, if the link is not acceptable at the anchor point, identify one of more first transmitter settings that is acceptable based in part on the required BER.

In a fourth aspect of the invention, a computer readable apparatus is disclosed. In one embodiment, the apparatus comprises a computer readable medium having at least one computer program disposed thereon. In one variant, the at least one computer program is configured to, when executed, determine one or more minimum first receiver requirements of the first receiver; calibrate one or more first transmitter settings based at least in part on the one or more minimum first receiver requirements; and initiate a link based on the calibrated one or more first transmitter settings.

In another aspect of the invention, a computerized system is disclosed. In one embodiment, the system comprises an Embedded DisplayPort (eDP) compatible transmitter and receiver.

Other features and advantages of the present invention will immediately be recognized by persons of ordinary skill in the art with reference to the attached drawings and detailed description of exemplary embodiments as given below.

Figure 1A:
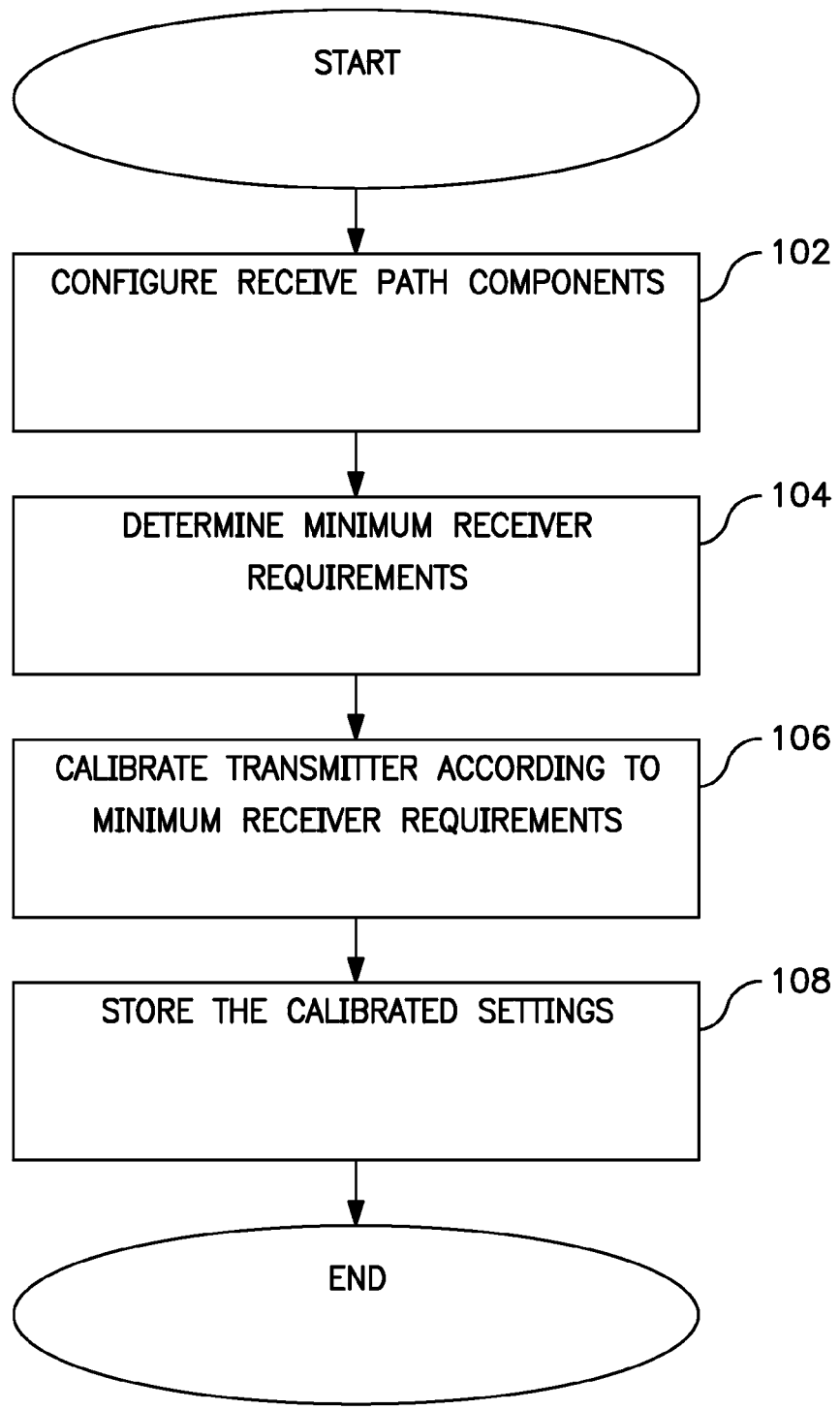
FIG. 1A is a logical flow diagram illustrating one embodiment of a generalized method for calibration of embedded interface operation in accordance with various aspects of the present invention.

All Figures © Copyright 2011 Apple Inc. All rights reserved.

DETAILED DESCRIPTION OF THE INVENTION

Reference is now made to the drawings, wherein like numerals refer to like parts throughout.

Overview

As noted supra, existing schemes for calibration are not well suited for embedded device operation. Accordingly, improved methods and apparatus for calibrating an embedded device in accordance with the minimum receiver requirements are described herein. In one exemplary embodiment, an embedded DisplayPort (eDP) source element (such as e.g., a graphics processing unit (GPU)) configures itself to support the minimum requirements necessary to support a sink element (such as a screen display). By tailoring the source to the specific requirements of the sink, the device can initialize faster, consume less power, etc. Unlike prior art calibration procedures that are configured for maximal interoperability, the exemplary eDP calibration sequence adjusts calibration goals according to a determined minimum "eye" that meets an acceptable bit error rate (BER) for the eDP sink.

Another benefit of the exemplary calibration process disclosed herein is that link performance that deviates from previously calibrated performance can be flagged, even if the link itself is still functioning. For example, certain manufacturing defects may compromise device operation without causing link failure; these defects will manifest themselves as reduced link performance. Since the exemplary calibration process has been tailored to the specific platform, deviations from the expected performance can be quickly identified and remedied during the manufacturing process. Device configuration issues and silicon variation can contribute to marginal performance that is not immediately apparent, and hence improved detection such as that provided by the invention can improve overall device robustness and user experience.

Detailed Description of Exemplary Embodiments

Exemplary embodiments of the present invention are now described in detail. While these embodiments are primarily discussed in the context of the Video Electronics Standards Association (VESA) DisplayPort (DP) and Embedded DisplayPort (eDP) audio/visual (A/V) bus protocol family of standards, it will be recognized by those of ordinary skill when given this disclosure that the present invention is not so limited. In fact, the various aspects of the invention are useful in literally any A/V bus protocol that can benefit from the various modifications and improvements described herein.

Additionally, the present invention is useful in any number of different types of devices including without limitation computers (desktops, towers, laptops, etc.), hand-held devices such as smart phones and MP3 players, digital readers or tablets, and navigation systems (hand-held and in-vehicle). For instance, exemplary consumer electronics products manufactured by the Assignee hereof that may benefit from one or more aspects of the invention include but are not limited to, the iPhone™, iPod™, iPad™, Macbook™, Macbook Pro™ Macbook Air™, etc.

As used herein, the term "DisplayPort" refers without limitation to apparatus and technology compliant with "VESA DisplayPort Standard" specifications. At the time of filing, existing publications of the "VESA DisplayPort Standard" include, but are not limited to "VESA DisplayPort Standard"—Version 1, Revision 2 dated Jan. 5, 2010; "VESA DisplayPort Panel Connector Standard"—Version 1.1 dated Jan. 4, 2008; "VESA DisplayPort PHY Compliance Test Standard"—Version 1.1a dated Oct. 26, 2009; and/or "VESA DisplayPort Link Layer Compliance Test Standard"—Version 1.1 a dated Oct. 2, 2009, as well as so-called "Mini DisplayPort" technology described in the VESA DisplayPort Version 1, Revision 2 dated Jan. 5, 2010, each of the foregoing being incorporated herein by reference in its entirety, and any subsequent revisions thereof.

Methods—

Referring now to FIG. 1A, one embodiment of a generalized method for calibration of embedded interface operation is described. In one exemplary embodiment, the embedded interface minimally includes a transmitter element, a receiver element, and a cabling element, where the entire assembly is packaged within a device. Within the context of an exemplary Embedded DisplayPort (eDP) device, the transmitter element is generally referred to as a "source", and the receiver element is generally referred to as a "sink". Common examples of sources include, without limitation, for example: processors, media codecs, etc. Common examples of sinks include, without limitation, for example: screen drivers, monitors, etc.

At step 102, the receiver and/or components of the receive path are configured with operational settings configured for receiving data traffic. In one exemplary embodiment, the operational settings include receiver equalization configurations. As a brief aside, receiver equalization adjusts the balance between frequency components within an electronic signal by amplifying or attenuating the energy of specific frequencies. Specifically, in the context of an Embedded DisplayPort (eDP) device, a receive equalizer will compensate for the channel effects experienced by the transmitted signal. The transmitted signal can be accurately reproduced at the receiver by accentuating frequencies that were attenuated (and attenuating frequencies that were unintentionally amplified, or accidentally introduced). This configuration may already be in place before beginning the method as well.

Receiver equalization is one example of receiver compensation, other common examples of receiver compensation include without limitation, for example: automatic frequency control (AFC), automatic gain control (AGC), phase locked loops (PLL), delay locked loops (DLL), clock data recovery, variable attenuation and gain. More generally, the receive path must be initialized so as to accurately represent the impairments of the receive path during normal operation (e.g., during data traffic loads).

In one embodiment, the operational settings are fixed for the device. For example, in embedded applications, the device topology may be simple enough to where a single fixed setting is sufficient for the life of the device. For instance, eDP devices with a single source and a single sink communicating over a fixed (and lossy) flex cable may be able to use a single lifetime receiver equalizer setting. Certain variants may additionally hardcode the receiver equalizer settings into the device.

In alternate embodiments, the operational settings are dynamically adjusted during operation. In certain embedded applications, device topology may change or may be sufficiently complex to where multiple receiver equalizer settings are necessary. Common examples of complex devices include, inter alia, a multiple processor architecture where multiple drivers for the same display panel are switched into and out of use e.g., on an application-to-application basis. In embodiments where multiple receive path configurations may be used, the calibration procedure (e.g., steps 102 through 108) may be iteratively repeated for each of the receive path configurations. The results of each iteration are stored for subsequent retrieval during use. In alternate embodiments, calibration is only performed for the worst case receive path configuration. In still other embodiments, only a subset of the receive path configurations may be calibrated (e.g., based on likely usage, historic usage, etc.). For example, in one such example, the embedded device may perform calibration for its most commonly used receiver configuration. For less commonly used receiver configurations, the embedded device may execute self-calibrating software at the time of use.

Referring back to multiple receive path topologies, the operational settings may include settings for e.g., multiple intermediary receive path components. For example, in one such variant, the operational settings include various settings for intermediary components such as multiplexers, switches, amplifiers, etc.

At step 104, the minimum receiver requirements are determined. In one exemplary embodiment, the receiver determines a minimum receiver requirement based on a test pattern received from the transmitter. Common examples of a test pattern include alternating ones and zeros of varying run length (i.e., consecutive zeros or ones are a "run", and have a "run length"), although other types of test sequences may readily be implemented by those of ordinary skill given the present disclosure.

In one exemplary embodiment, during the calibration process the transmitter transmits a test pattern to the receiver, and the receiver analyzes the received pattern for acceptable performance. If the receiver determines that the received pattern is acceptable, than the transmitter can adopt more aggressive settings (which will further diminish the signal quality, but improve e.g., link speed, power consumption, etc.). This process is repeated until the link no longer performs acceptably (or the settings for the transmitter cannot be further adjusted). In this manner, the transmitter and receiver determine the minimum receiver requirements (i.e., the most aggressive setting that performs acceptably). In one exemplary embodiment, the receiver or sink instructs the transmitter or source to use a different setting (i.e., the source obeys the sink).

Figure 2:
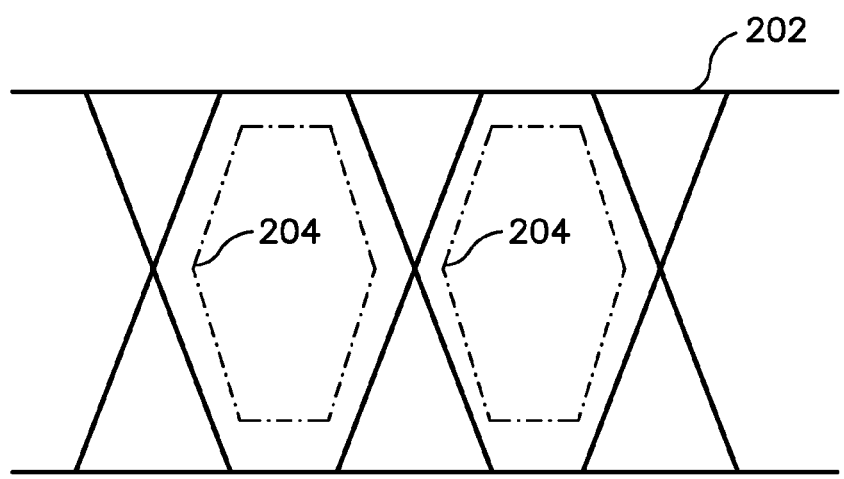
FIG. 2 is a graphical illustration of an eye diagram provided for illustrative purposes.

As a brief aside, FIG. 2 illustrates an exemplary "eye diagram" used within the related arts. An eye diagram is a pattern 202 produced (e.g., on test equipment) when a digital signal on a transmission line is repetitively sampled by using logic level transition edges to trigger a horizontal sweep. Between transitions, the measured voltage can be at a discrete level (e.g., 0, 1). However, undesirable transmission line effects will "close" the eye. For example, clock jitter will randomly increase or decrease the amount of time between transition edges, which narrows the eye between transitions. Similarly, poorly matched line impedances will introduce signaling reflections, undershoots, and overshoots, which will muddy the distance between the discrete levels of the eye.

Eyes are typically further evaluated with the use of an "eye mask" 204. The eye mask indicates the degree of acceptable deviance from the eye before the receiver misinterprets the signaling. In other words, the eye mask represents the maximum system tolerance for channel effects. Thus, an eye that crosses into the eye mask will have an unacceptable error rate.

Referring back to FIG. 1A, in one exemplary embodiment, an Embedded DisplayPort (eDP) source transmits a known physical clear-to-send (PHY CTS) test pattern to an eDP sink. The eDP sink determines a bit error rate (BER) based on the received signals. If the BER is higher than a threshold BER, then the test pattern has not been properly received; this information is indicated to the transmitter. Responsively, the transmitter will adjust its operation. Similarly, if the BER rate is lower than a threshold BER then the receiver indicates this to the transmitter. In this manner, the receiver and transmitter can iteratively determine the minimum receiver requirements. It is of particular note that unlike the prior art (where the transmitter must conform to a specified eye diagram to ensure broad compatibility), various embodiments of the present invention are calibrated according to the specific receiver requirements (i.e., if the eye mask was determined for the receiver, it would be specific to the receiver).

Where multiple receiver configurations are being iteratively tested, a minimum receiver requirement is determined for each one of the multiple receiver configurations. In some embodiments, each of the determined minimum receiver requirements is used for subsequent steps (step 106, step 108). Alternately, only the worst case-minimum receiver requirement is used for subsequent steps. In still other variants, only a subset of the minimum receiver requirements are used for subsequent steps (e.g., based on likelihood of use, etc.)

In other implementations, the determined minimum receiver requirements may include for example, minimum received power, maximum allowed distortion, maximum skew, maximum jitter. For example, in one such implementation the transmitter may intentionally reduce power, distort the signal, or introduce skew (or introduce jitter) of a test pattern. The receiver feedback can be used to determine an absolute device limit as well.

Moreover, while bit error rate (BER) is generally used to determine acceptable or unacceptable operation within DisplayPort compliant systems, other metrics may be equivalently substituted. Common examples of metrics include for example: packet error rate (PER), block error rate (BLER), cyclic redundancy checks (CRC), parity.

At step 106 of the method of FIG. 1A, the transmitter calibrates its operational settings according to the determined minimum receiver requirements. For example, in one exemplary embodiment, the transmitter stores the operational settings for its physical transmit parameters associated with the minimum receiver requirements. Other common examples of physical transmit parameters may include without limitation, current drive, configurable delay, etc.

In one exemplary embodiment, the transmitter identifies and associates an "anchor point" to the determined minimum receiver requirements. Specifically, the anchor point represents the most aggressive operational settings that are capable of supporting the minimum receiver requirements.

In one such variant, one or more other operational settings are determined relative to the anchor point. Consider a transmitter that is configurable to output voltages from 100 mV to 800 mV in 100 mV increments. If the anchor point is determined to be 200 mV and the other transmit settings must be in doubling increments relative to the anchor point, then voltages 400 mV, and 800 mV are suitable transmit settings.

In alternate variants, the transmitter may identify the physical transmit parameters associated with the minimum receiver requirements, and enable physical transmit parameter combinations that exceed the capabilities of the minimum receiver requirements. For instance, in the aforementioned example, if the anchor point is determined to be 400 mV and no relative restriction exists, then voltages 500 mV, 600 mV, 700 mV, and 800 mV may be enabled.

At step 108, the transmitter stores the calibrated transmitter operational settings for later use. In one exemplary embodiment, the calibrated transmitter settings are enumerated according to a notation scheme. For example, in one such variant, transmitter operational settings include a number of voltage swing values and a number of pre-emphasis values. The transmitter can be set to any of the values according to the notation [voltage swing, pre-emphasis]. In this example, an anchor point is enumerated as [0,0]. Relative settings are listed with reference to the anchor point e.g., the transmitter can be configured for operation according to [0,1] which indicates voltage swing level 0 (i.e., the anchor point voltage level swing), and pre-emphasis level 1 (which might be for example 3.5 dB greater than pre-emphasis level 0). Furthermore, these transmitter operational settings can be further generalized to cover any transmitter specific signaling conditioning controls. For example, in DisplayPort High Bit Rate 2 (HBR2) operation, other signal conditioning settings include for example, Post Cursor 2 type operation.

In some implementations, the various calibrated transmitter settings are hardcoded into the device for later use, or alternatively calibration can be performed at the manufacturer. Alternately, calibration may be performed by the user or a third-party maintenance personnel. Combinations of the foregoing are also possible.

Once a device has been calibrated, the device can be used for link establishment according to a link initialization protocol.

Figure 1B:
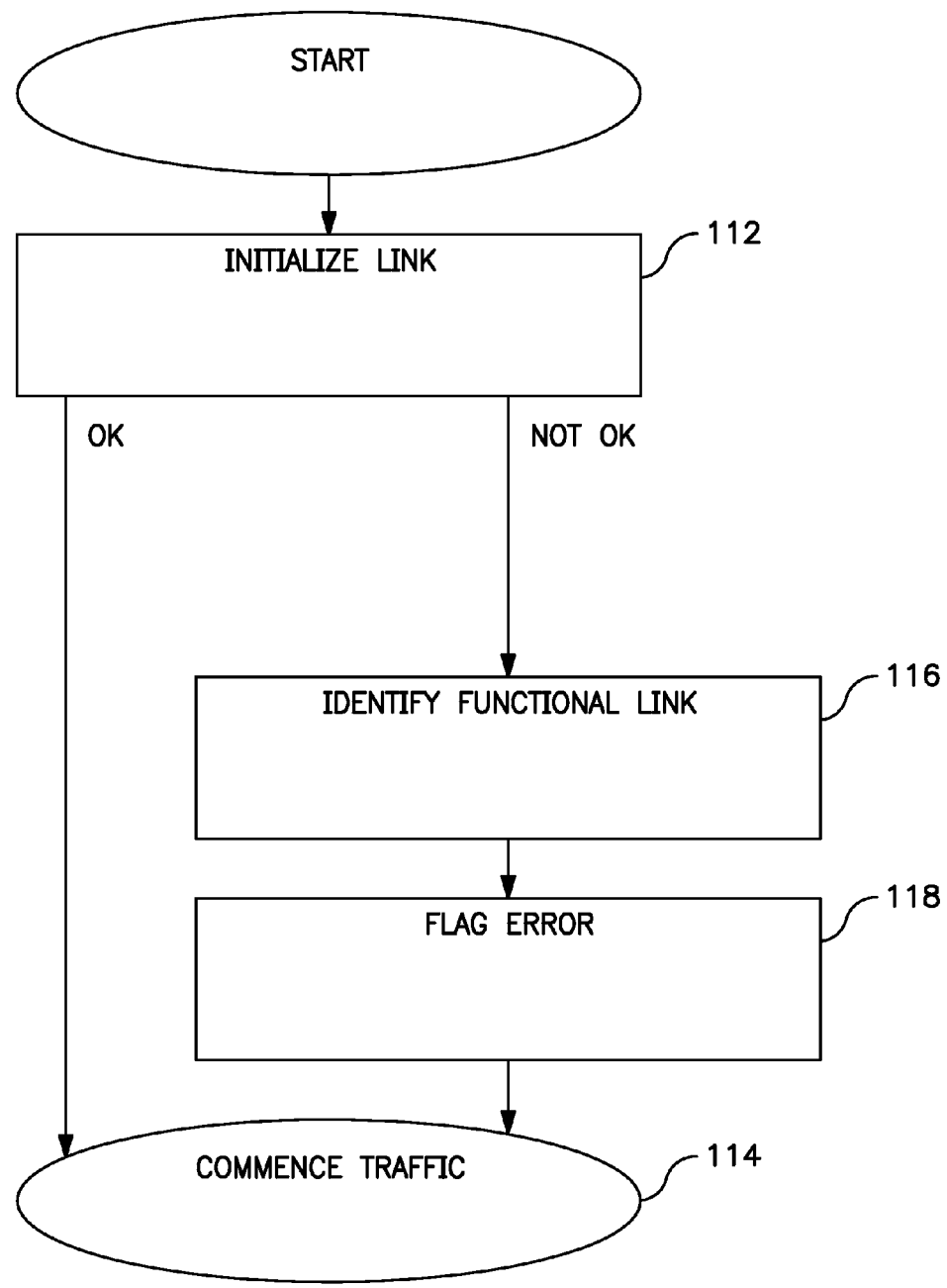
FIG. 1B is a logical flow diagram illustrating one embodiment of a generalized method for link initiation for an embedded interface in accordance with various aspects of the present invention.

Referring now to FIG. 1B, one embodiment of a generalized method for link initialization of embedded interface operation is described.

Responsive to the link being activated between the transmitter and receiver, at step 112, the transmitter and receiver attempt to initialize the link with a minimum required configuration. In one exemplary embodiment, the minimum required configuration was determined based on a calibration sequence (see FIG. 1A). For example, within the context of the exemplary embodiment of Embedded DisplayPort (eDP), the eDP source and sink initialize at [0,0] (which is the anchor point that the eDP devices were calibrated with). If the minimum configuration is acceptable, the transmitter and receiver can commence link traffic (step 114).

If the minimum configuration is unacceptable, the transmitter and receiver search through the possible configurations to identify a functional link condition (step 116)

In one exemplary embodiment, the transmitter and receiver attempt to identify a satisfactory link by iteratively trying various transmit and receive configurations. For instance, an Embedded DisplayPort (eDP) source will attempt all adjacent configurations; e.g., if configuration [0,0] fails, then the transmitter and receiver will attempt configurations [0,1], [1,0] and [1,1]. If the first set of adjacent configurations do not work, then the next set of adjacent configurations are attempted, etc. until all combinations are exhausted.

In still other variants, the iterative search may go to the maximum configuration (e.g., [3,3]) and determine if the maximum configuration satisfies the link requirements. If the maximum configuration does satisfy the link requirements, then an intermediary configuration is tested (e.g., [1,1]), and depending on success or failure of the intermediary test, the process is iterated in a mutually exclusive cumulatively exhaustive search (MECE). If even the maximum configuration does not satisfy the link requirements, then the device is in an unrecoverable hardware error, and the link cannot be initialized.

At step 118, if the device is unable to operate within the minimum configuration, the device may flag a warning even if the link is successfully established with another configuration. In fact, it will be recognized by those of ordinary skill in the related arts that the link initialization should have succeeded at step 112 if there was no channel impairment. Thus, a channel impairment exists if link initialization failed at step 112 regardless of the final functional status of the link.

Accordingly, if the device does not succeed at step 112, the device can be flagged as a faulty system, even if the link itself is still functioning. Over the life of the device, the link may eventually degrade without causing link failure. These defects will manifest themselves as reduced link performance. Alternately, the device may have manufacturing defects that affect the link performance (even if the link is still operational). By flagging such "soft" errors, devices can identify maintenance and repair issues before they become problematic.

Prior Art DisplayPort Device Calibration—

As a brief aside, the prior art DisplayPort electrical specification specifies a set of nominal voltage swings and pre-emphasis combinations that the transmitter is required to generate during calibration (calibration is commonly performed at manufacture). During link initialization e.g., when the DisplayPort link is used, the transmitter (source) and receiver (sink) conduct a training process. The training process allows the receiver to compensate for the various loses introduced into the transmission channel e.g., by the cabling, etc. Specifically, the receiver selects a voltage swing and pre-emphasis combination (the combinations being set during calibration) that yields the best signal at the receiver, thereafter the transmitter configures itself to use the selected combination.

Referring now to the calibration process, the prior art DisplayPort standards define four (4) nominal voltage swing levels (numbered 0-3), and four (4) nominal pre-emphasis levels (numbered 0-3). These combinations are generally represented according to the following notation: [voltage swing level, pre-emphasis level] (i.e., [2,0] specifies: voltage swing level 2, and pre-emphasis level 0). Of the sixteen (16) possible combinations, eight (8) are mandatory, two (2) are optional, the remaining settings are not currently used.

Extant solutions for DisplayPort defines the required electrical properties at the source connector (TP2) (as with Embedded DisplayPort (eDP), DisplayPort designates the following test points: (i) the source silicon package pins (TP1), (ii) the source device connector (TP2), (iii) the sink device connector (TP3), and (iv) the sink silicon package pins (TP4)). Specifically, the prior art DisplayPort standard specifies that with an "anchor point" setting of [2,0], TP2 must present an eye mask that conforms to the DisplayPort standard. The remaining combinations are determined relative to the anchor point [2,0] (or from combinations that were derived from the anchor point). For example, setting [1,0] is defined as being having a 2.5 dB lower voltage swing than setting [2,0].

Thus, prior art DisplayPort calibration must first ensure that the anchor point [2,0] meets the mask requirements. Once the anchor point is successfully calibrated, the actual voltage swing and pre-emphasis levels are measured at the anchor point. Thereafter, the "adjacent" settings are calibrated (e.g., [2,1], [1,0], and [3,0]) according to requirements measured relative to the anchor point. As used with respect to eDP link settings, the term "adjacent" refers generally to a setting that does not differ by more than either one voltage swing level and/or one pre-emphasis level. In some cases adjacent settings are further limited such that voltage settings are always calibrated vertically with a pre-emphasis of 0, whereas pre-emphasis is calibrated horizontally from [n,0]. For example, from [2,0] the settings for [2,1], [1,0], and [3,0] can be calibrated. From [1,0], the settings [1,1] and [0,0] can be calibrated. From [1,2], the setting [1,2] can be calibrated. From [0,0] setting [0,1] can be calibrated, which is used to calibrate [0,2], which is used to calibrate [0,3]. The process is iteratively repeated until all 10 combinations are calibrated (i.e., [2,2], [1,1], [3,1] are adjacent to, and derived from [2,1]).

Referring now to normal operation, the DisplayPort source and sink must initialize the link with a link training procedure before use. The link training procedure ensures that the optimal setting (i.e., the setting determined in calibration) is used (e.g., acceptable power consumption, and bit error rate (BER)). Existing solutions for link training start at the most aggressive setting [0,0] (which is not the anchor point). The DisplayPort source transmits a test signal, and the sink evaluates the received signal. Problems in the link will manifest as a higher than expected Bit Error Rate (BER) (i.e., BER is a measure related to the difference between the transmitted test signal and the received test signal). If the BER is unacceptable, the source and sink adjust the setting. The process iterates until the source and sink have determined a setting that provides an acceptable BER.

The DisplayPort sink typically implements some form of receiver equalization which, inter alia, compensates for channel impairment (e.g., cable loss, electromagnetic interference (EMI), etc.). In some cases, receiver equalization may be performed in combination with link training; in fact, it may even be preferred to use receiver equalization instead of iteratively searching for appropriate link training settings. It is however noted that while receiver equalization can be adjusted during link training, it is a distinct process implemented by the DisplayPort sink.

In existing DisplayPort implementations, link initialization will typically verify that setting [0,0] is satisfactory (or one of its adjacent combinations ([1,0], [0,1])). It is unusual for settings as high as [2,X] to be selected. Anecdotal evidence suggests that receiver equalization adequately compensates for the channel impairments, thus commonly enabling operation with a properly calibrated [0,0] setting.

Example—Embedded DisplayPort (eDP) Device Calibration

Various aspects of the present invention are directed to improved solutions for optimizing link calibration for embedded type devices. Embedded DisplayPort (eDP) is a variant of the DisplayPort standard that has been specialized for use within embedded systems. Specifically, as described in greater detail herein, eDP devices have been designed for embedded systems that have known topologies (i.e., known source, sinks, and cable losses).

Figure 3:
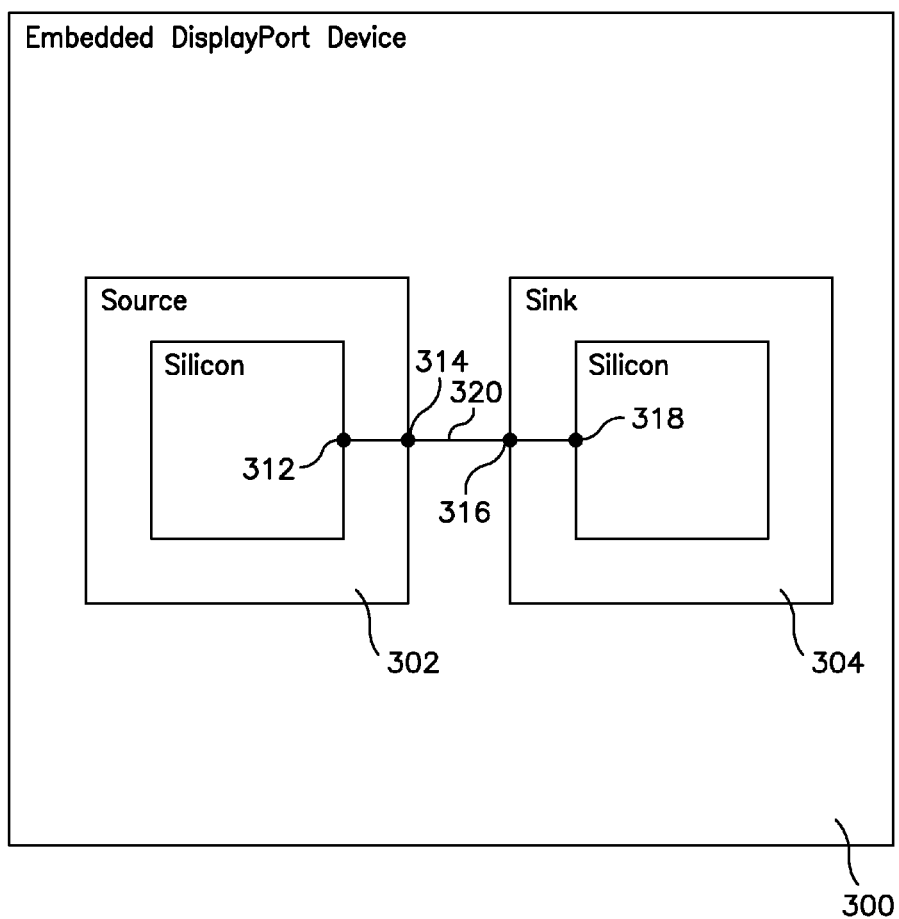
FIG. 3 is a block diagram of one embodiment of a device (Embedded DisplayPort compatible in this embodiment) configured to calibrate a link in accordance with the present invention.

Referring now to FIG. 3, one exemplary Embedded DisplayPort (eDP) device 300 is illustrated, and includes an eDP source 302 and an eDP sink 304, where the source and sink are in very close proximity (in some cases, completely obviating transceivers, cable connectivity, etc.). The eDP interface includes: (i) one or more (e.g., 1, 2, 4) main link differential pairs for transferring data (also commonly referred to as "lanes"), (ii) at least one auxiliary link differential pair for control signaling (also commonly referred to as "AUX"), (iii) power and ground. Data is encoded with 8b10b encoding (i.e., each 8 bits of information are encoded with a 10 bit symbol) and packetized for transfer.

As shown in FIG. 3, the exemplary Embedded DisplayPort (eDP) device 300 has several salient test points (TP) useful for calibration. Specifically, these test points are designated as: (i) the source silicon package pins (TP1) 312, (ii) the source device connector (TP2) 314, (iii) the sink device connector (TP3) 316, and (iv) the sink silicon package pins (TP4) 318. Additionally, a flex cable 320 is also shown. It is of particular note that connectivity of any type is lossy, where the degree of loss is related at least in part to the length, environment, and/or quality of the cabling.

It will be readily recognized by those of ordinary skill in the related arts, that the foregoing test points are expressly chosen to simplify component sourcing from third party manufacturers; in other manufacturing arrangements, the test points used in calibration may be different, and the foregoing are merely illustrative of the broader principles. For example, in some devices TP3 316 is not accessible (e.g., smaller devices that have directly attached the cable to the glass of the display).

Common commercial examples of devices which are suitable for Embedded DisplayPort (eDP) operation, include but are not limited to, the iPhone™, iPod™, iPad™, etc. products manufactured by the Assignee hereof.

Figure 4:
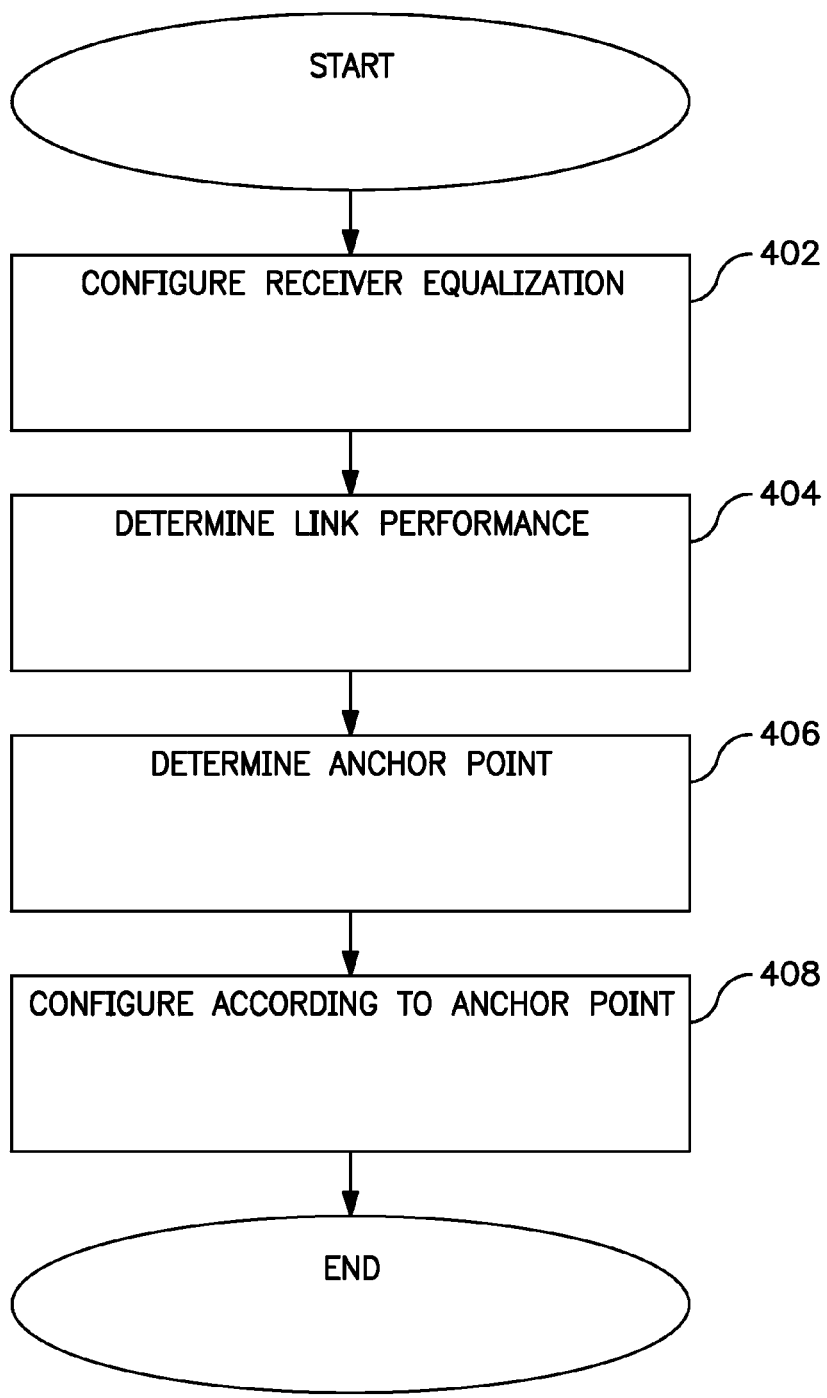
FIG. 4 is a logical flow diagram of an exemplary method for calibrating the exemplary Embedded DisplayPort device of FIG. 3 in accordance with one aspect of the present invention.

Referring now to FIG. 4, one exemplary method for calibrating an Embedded DisplayPort (eDP) link for the eDP device 300 of FIG. 3 is disclosed. Unlike the prior art DisplayPort calibration procedure described above, eDP is a "closed" system in that the eDP source, sink, and channel are fixed (i.e., a closed system does not have to interact with other DisplayPort or eDP devices). Thus, rather than calibrating the eDP source to meet a specification-defined set of electrical properties, FIG. 4 describes calibrating the eDP source to meet the requirements of the eDP sink and cabling assembly.

At step 402 of FIG. 4, a value for receiver equalization is selected for the sink. In the exemplary embodiment, the value is selected to: (i) at least partially compensate for the inter-symbol interference (ISI) in the channel, and (ii) safely avoid over-equalization. For the purposes of illustration, the receiver equalization is set at a fixed value (i.e., receiver equalization is not dynamically determined during link training or during normal operation).

At step 404, the performance of the sink is evaluated. For example, by using a procedure based on the DisplayPort Physical Layer Compliance Test Specification (PHY CTS) procedures, the minimum eye (the appropriate eye mask) at the sink that is necessary to provide an acceptable bit error rate (BER) e.g., $1 \times 10^{-14}$ can be determined. In one such example, the stressed signal generator is used to incrementally stress the electrical signaling levels and jitter of a test pattern until the measured BER falls below the acceptable BER. The receiver can be evaluated by applying this stressed signal to the sink connector (TP3). The stressed signal is generated using the stressed signal generator connected to the source end of the flex cable, so that it is transmitted over the flex cable, and measured at the sink connector (TP3). This ensures that the signal at TP3 includes the impairments introduced by the flex cable. The signal can be incrementally stressed by further increasing jitter (e.g., adding sinusoidal jitter, etc.), and/or reducing the signal amplitude (e.g., voltage swing). If the measured BER falls below the acceptable BER, the resulting marginal eye (at the setting just before failure) is the minimum eye necessary to support the acceptable BER.

At step 406, the source is calibrated to generate the appropriate electrical signals at an anchor point setting, based on the performance of the link. In one exemplary embodiment, the settings for the anchor point are associated with to the transmitter settings that reproduce the minimum eye necessary to support the acceptable BER (determined in step 404). The GPU or driver settings that result from this calibration are then associated with the eDP voltage swing level 0, and pre-emphasis level 0 (i.e., [0,0]). Therefore, the [0,0] is experimentally determined to sustain the acceptable BER (e.g., provide a BER better than $1 \times 10^{-14}$). As a final step, the [0,0] combination is selected as the anchor point.

Traditional DisplayPort sources must provide interoperability capabilities with all DisplayPort compliant sink devices; consequently, anchor point [2,0] is chosen as a reasonable compromise of source capabilities (i.e., more conservative and more aggressive settings are available). In contrast, Embedded DisplayPort (eDP) systems have a known configuration, thus more aggressive settings are not necessary. In otherwords, since [0,0] represents the minimally acceptable use case for the known configuration, lower settings cannot be used anyway. Additionally, one benefit of setting the anchor point to [0,0] is that link training is faster. Recall that traditional DisplayPort implementations must test out the [2,0] anchor point, and then derive and iteratively test adjacent channels to determine the optimal setting (which as noted generally settles at [0,0]). Since link training initializes at [0,0], the link training procedure can immediately conclude if [0,0] is sufficient, and commence operation.

It should be noted that eDP settings are distinct from the Graphics Processor Unit (GPU)/driver settings. GPU/driver settings specify the actual voltage swing (mV), and pre-emphasis (dB), either directly or indirectly (depending on the specific GPU implementation). In contrast, eDP settings are relative levels considered with respect to a signaling eye. As a practical matter, this can be further complicated as GPU/driver settings may use notation that is easily confused with the eDP settings. For example, a sink that requests a [0,0] eDP setting, may result in a GPU configuring its GPU settings to 400 mV swing that is represented as a "0", and pre-emphasis of 3.5 dB which is represented as "1". GPUs may further include fine-tuning registers that are used to further fine-tune the generated electrical signals.

At step 408 of the method, the source hardware is configured according to the anchor point. In one exemplary embodiment, the Graphics Processor Unit (GPU)/driver settings are configured to satisfy the DisplayPort settings adjacent to the [0,0] anchor point (e.g., [0,1], [0,2], [1,0] and [1,1]) for relative voltage swings and pre-emphasis as defined in the DisplayPort specification.

Hardware configuration may additionally include conformance to design specific constraints. Common parameters which may be design specific include, for example: jitter, skew, and frequency compliance. For example, in one exemplary embodiment, frequency compliance is measured at the source connector (TP2) for conformance to a design specific jitter standard, and skew and jitter are validated at the sink connector (TP2) for conformance to a design specific requirement. The flex cable has no effect on frequency compliance, so frequency compliance can be measured at either TP2 or TP3. However, the flex cable does affect skew and jitter, so these effects are preferentially measured as close to the sink silicon as possible e.g., TP3 (for designs where TP3 is not accessible, TP2 can be used instead).

Moreover, existing DisplayPort solutions measure the effects at TP2, and add significant margin to accommodate a hypothetical "worst case" cable. In contrast, the exemplary embedded device of the present invention does not need to support a wide variety of cables, and can tailor operation to the actual cable. For designs that multi-source flex cables, the process may be repeated for each flex cable manufacturer to ensure that the calibrated settings work across all manufactured versions of these cables. In fact, design specific constraints may be iteratively determined (e.g., performed over several receiver equalization settings, etc.) to determine the optimal configuration, based on design or application considerations.

One benefit of the illustrated embodiment of the invention is that a single compliance point can be used for measuring the receiver performance and performing transmit calibration. For example, in the aforementioned embodiment of FIGS. 3 and 4, the overall device calibration (including the steps of evaluating the sink requirements and source performance) can be determined at the same test point (e.g., sink connector (TP3)). Unlike traditional DisplayPort (which measures the receiver performance at 316, and transmitter performance at 314), in one exemplary embodiment, both receiver performance and transmitter performance are measured at the same point (which could be either 314 or 316).

It is further appreciated that in some instances, calibration can be implemented across multiple test points e.g., to accommodate accessibility limitations.

Another salient benefit is that the calibration measurements are specific to the eDP sink requirements (as opposed to the legacy DisplayPort implementations which attempt to control the source output electrical properties). Specifically, eDP calibration is not performed according to a generic eye mask, but is instead tailored for the minimum eye required by the eDP sink.

Similarly, for system designs that incorporate multiple GPUs, each GPU can be calibrated separately. Such designs may have other test points of interest (i.e., due to an intermediary multiplexer, etc.). However, the general operation remains the same e.g., the anchor point [0,0] is determined, and calibration is performed at TP3 (sink connector) according to a determined minimum eye.

Furthermore, those of ordinary skill in the related arts will recognize (given the present disclosure) that the foregoing embodiment can be further adapted to service any arbitrarily sized population of devices, and/or device configurations. For example, for designs that accommodate multiple display panel types, step 404 can be repeated for each of panels; where the "worst" eye is selected for all device configurations; in otherwords, if the eye mask is bigger, then the transmitter must operate to tighter tolerances and is considered "worse". If the transmitter eye itself is bigger, then this is a "better" eye. Similarly, for multi-GPU designs that may be sourced from multiple multiplexer vendors, each GPU must be verified against the minimum eye, for each applicable multiplexer setting.

Those of ordinary skill in the related art will also recognize that the foregoing embodiment provides multiple improvements over existing solutions for calibration. For example, unlike prior art calibration procedures that are configured for maximal interoperability, the exemplary eDP calibration sequence adjusts calibration goals according to a determined minimum eye that meets an acceptable bit error rate (BER) for the eDP sink. Since calibration is tailored to the specific system design, tailored calibration levels can result in lower voltage swings and drive currents, which greatly improve (reduce) power consumption.

Moreover, since the exemplary calibration method ensures that the initial link initialization setting ([0,0]) supports the minimum acceptable bit error rate (BER), thus link initialization can be performed much faster.

Yet, another benefit of the exemplary calibration process is that any device that performs link initialization and does not select the initial link initialization setting (i.e., fails the [0,0] initialization) can be flagged as a faulty system, even if the link itself is still functioning. For example, certain manufacturing defects may compromise device operation without causing link failure, these defects will manifest themselves as reduced link performance. Device configuration issues and silicon variation can contribute to marginal performance that is not immediately apparent, but which will over time result in decreased product lifetimes and user dissatisfaction. Since the exemplary calibration process has been tailored to typical platform operation at a minimum eye, deviations from the expected minimum eye can be quickly identified and remedied during the manufacturing process. In fact, anecdotal manufacturing data obtained by the Assignee hereof suggests that nearly ⅓ (one third) of manufactured may be visually acceptable (i.e., indistinguishable from normal operation) and still fail more rigorous testing.

Moreover, if throughout the lifetime of the device, the cabling or connectivity deteriorates, the link training can compensate to some degree without impacting the user experience. For example, if the connection starts to go to a higher resistance, or if one side of the differential pair fails, the link training can still result in a reliable link. The user experience may not be impacted by the failure. However, it may be advisable that even if the link is functional, the device provides a further indication that maintenance is necessary (i.e., so that a qualified service technician can repair or replace the cause of the link impairment.

Apparatus—

Figure 5:
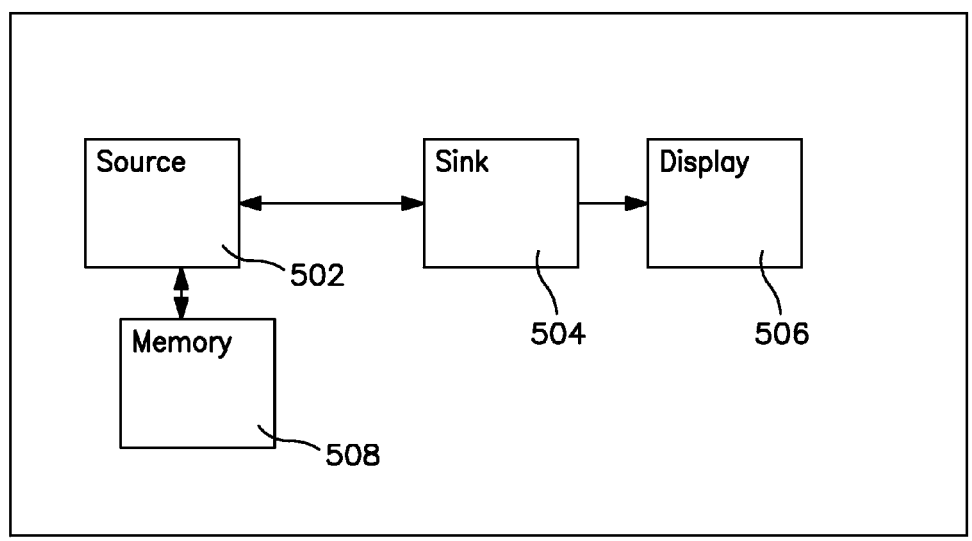
FIG. 5 is a block diagram of an exemplary user device apparatus configured to calibrate a link in accordance with various aspects of the present invention.

Referring now to FIG. 5, an exemplary user device apparatus 500 implementing the exemplary embedded DisplayPort (eDP) solution is illustrated, although it will be appreciated that more generally, the methods and apparatus described herein are in no way limited to eDP.

As used herein, the term "user device" includes, but is not limited to cellular telephones, smart phones (such as for example an iPhone™), personal computers (PCs), such as for example Macbook™, Macbook Pro™ Macbook Air™, and minicomputers, whether desktop, laptop, or otherwise, as well as mobile devices such as handheld computers, PDAs, video cameras, set-top boxes, personal media devices (PMDs), such as for example an iPod™, iPad™, display devices (e.g., those compliant with the aforementioned DisplayPort standard(s)), or any combinations of the foregoing. While a specific device configuration and layout is shown and discussed, with respect to FIG. 5, it is recognized that many other implementations may be readily implemented by one of ordinary skill given the present disclosure, the apparatus 500 of FIG. 5 being merely illustrative of the broader principles of the invention.

The illustrated apparatus 500 of FIG. 5 includes a first processor 502, a second processor 504, and a display element 506, embedded within a very high density form factor design. In one exemplary embodiment, the first and second processors (502, 504) includes one or more of central processing units (CPU) or digital processors, such as a microprocessor, digital signal processor, field-programmable gate array, RISC core, or plurality of processing components mounted on one or more substrates.

The first processor is coupled to operational memory 508, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The second processor is coupled to the display element 506. Common examples of display elements include but are not limited to: Liquid Crystal Display (LCD), Light Emitting Diode (LED), LED/LCD, Electroluminescent display (ELD), Cathode ray tube (CRT), Plasma Display Panel (PDP), Liquid Crystal on Silicon (LCoS), etc. More exotic display elements include for example: Organic light-emitting diode (OLED), Organic light-emitting transistor (OLET), Surface-conduction electron-emitter display (SED), Field emission display (FED).

In one exemplary embodiment, the first processor 502 includes an embedded DisplayPort (eDP) source 502, and the second processor 504 includes a embedded DisplayPort (eDP) sink 504. The eDP source is further adapted to transmit one or more media streams to the eDP sink for display via the display element. In one exemplary embodiment, the eDP source and sink are connected via signal trace, short cable, etc. The eDP interface generally includes (i) one or more (e.g., 1, 2, 4) main link differential pairs for transferring data, (ii) at least one auxiliary link differential pair for control signaling, (iii) power and ground.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances (e.g. and without limitation, the "configure receive path components" step of FIG. 1A, or the flag error step of FIG. 1B). Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus comprising a transmitter and a receiver, where the transmitter is coupled to the receiver with a lossy connection, comprising:
   a processor; and
   a computer readable apparatus having a storage medium with at least one computer program stored thereon, the at least one computer program configured to, when executed on the processor:
   determine one or more minimum first receiver requirements of the receiver;
   calibrate one or more first transmitter settings based at least in part on the one or more minimum first receiver requirements;
   assign the calibrated one or more first transmitter settings to one or more relative anchor points;
   store the one or more relative anchor points; and
   responsive to a subsequent operation, initiate a link based on the stored one or more relative anchor points.

2. The apparatus of claim 1, wherein the link initiation comprises a selection of one of the one or more relative anchor points.

3. The apparatus of claim 2, wherein the one or more first transmitter settings comprises at least a voltage swing level and a pre-emphasis level.

4. The apparatus of claim 2, wherein at least one of the one or more relative anchor points comprises a default anchor point, and the default anchor point is associated with the one or more minimum first receiver requirements.

5. The apparatus of claim 4, wherein the at least one computer program is further configured to, when executed:
   initiate the link at the default anchor point.

6. The apparatus of claim 5, wherein the at least one computer program is further configured to, when executed:
   verify when the initiated link is acceptable at the default anchor point based at least in part on a required bit error rate (BER); and
   when the link is acceptable, commence operation.

7. The apparatus of claim 1, wherein the at least one computer program is further configured to, when executed, assign the one or more relative anchor points to corresponding absolute settings.

8. A method for calibrating operation of at least a transmitter for a receiver, based on one or more minimum receiver requirements of the receiver, comprising:
   during a calibration mode:
      configuring one or more receive path components;
      determining the one or more minimum receiver requirements of the receiver, the one or more minimum receiver requirements being based at least on a bit error rate (BER) calculated from a received test pattern;
      calibrating one or more transmitter settings based at least in part on the one or more minimum receiver requirements, the one or more minimum receiver requirements comprising at least a minimum eye requirement specific to the receiver;
      assigning the calibrated one or more transmitter settings to one or more relative anchor points;
      storing the one or more relative anchor points; and during a subsequent operation mode:
  initializing a link based at least on the stored one or more relative anchor points.

9. The method of claim 8, wherein the initializing comprises a selecting one of the stored one or more relative anchor points.

10. The method of claim 8, wherein the one or more transmitter settings comprises at least a voltage swing level and a pre-emphasis level.

11. The method of claim 8, wherein at least one of the one or more relative anchor points comprises a default anchor point, and the default anchor point is associated with the one or more minimum first receiver requirements.

12. The method of claim 11, further comprising:
  verifying when the initiated link is acceptable at the default anchor point based at least in part on a required bit error rate (BER); and
  when the link is acceptable, commencing operation.

13. The method of claim 8, further comprising assigning the one or more relative anchor points to corresponding absolute settings.

14. A non-transitory computer readable apparatus comprising media configured to contain at least one computer program having a plurality of instructions, said plurality of instructions which, when executed:
  determine one or more minimum first receiver requirements of the receiver;
  calibrate one or more first transmitter settings based at least in part on the one or more minimum first receiver requirements;
  assign the calibrated one or more first transmitter settings to one or more relative anchor points;
  store the one or more relative anchor points; and
  responsive to a subsequent operation, initiate a link based on the stored one or more relative anchor points.

15. The non-transitory computer readable apparatus of claim 14, wherein the link initiation comprises a selection of one of the one or more relative anchor points.

16. The non-transitory computer readable apparatus of claim 15, wherein the one or more first transmitter settings comprises at least a voltage swing level and a pre-emphasis level.

17. The non-transitory computer readable apparatus of claim 15, wherein at least one of the one or more relative anchor points comprises a default anchor point, and the default anchor point is associated with the one or more minimum first receiver requirements.

18. The non-transitory computer readable apparatus of claim 17, wherein the at least one computer program is further configured to, when executed:
  initiate the link at the default anchor point.

19. The non-transitory computer readable apparatus of claim 18, wherein the at least one computer program is further configured to, when executed:
  verify when the initiated link is acceptable at the default anchor point based at least in part on a required bit error rate (BER); and
  when the link is acceptable, commence operation.

20. The non-transitory computer readable apparatus of claim 14, wherein the at least one computer program is further configured to, when executed, assign the one or more relative anchor points to corresponding absolute settings.

* * * * *